July 31, 1956          H. GARNEAU          2,756,479
APPARATUS FOR FORMING A PROTECTIVE SHEATH ABOUT AN
END PORTION OF A PIPE HAVING AN INTERNAL LINER
Filed Jan. 14, 1955          2 Sheets-Sheet 1
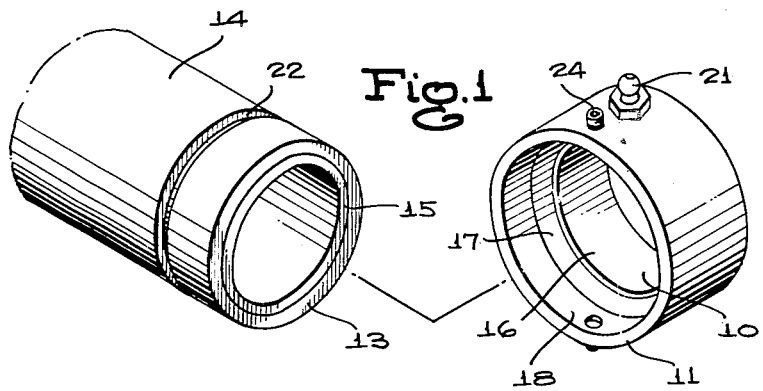
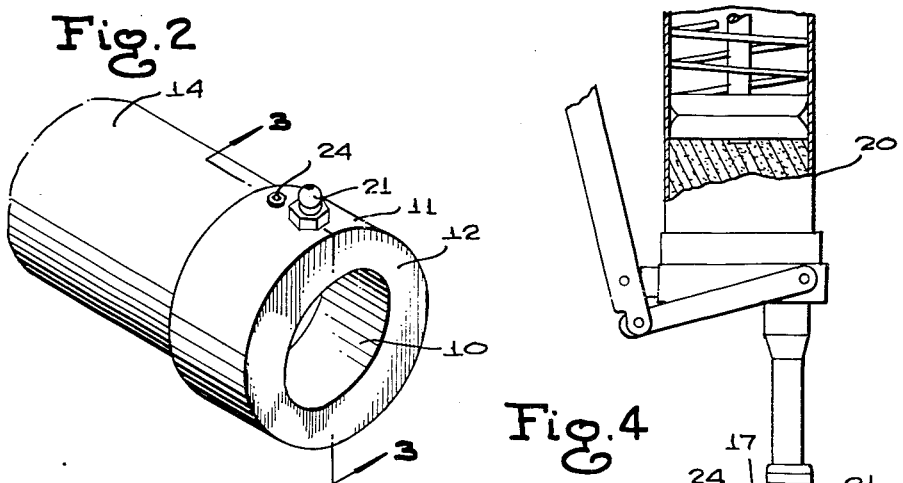
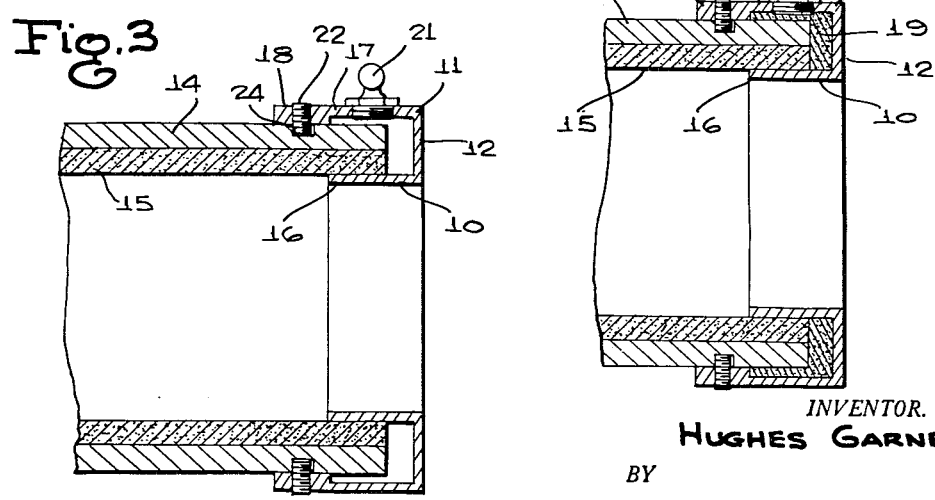
INVENTOR.
HUGHES GARNEAU
BY
McMorrow, Berman + Davidson
ATTORNEYS

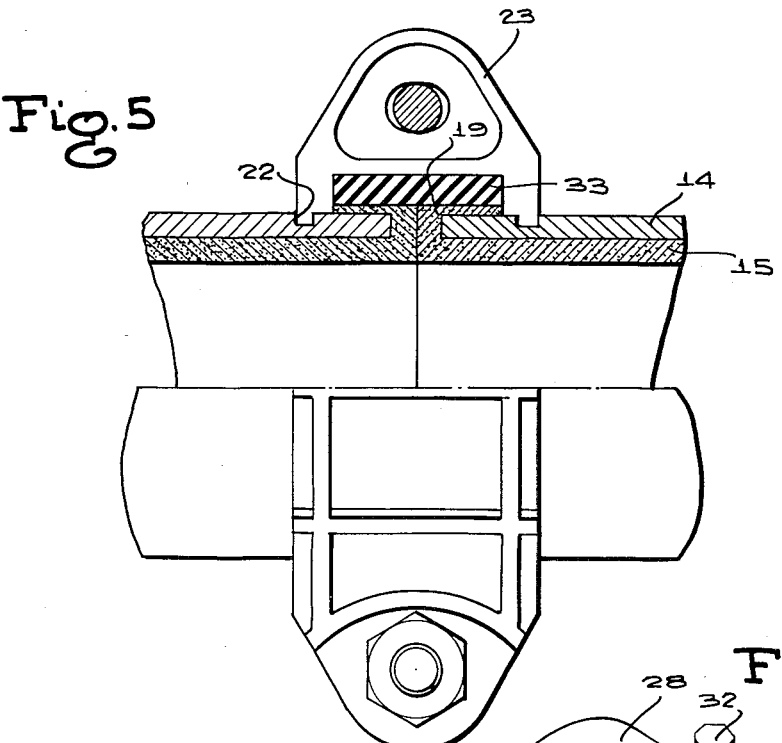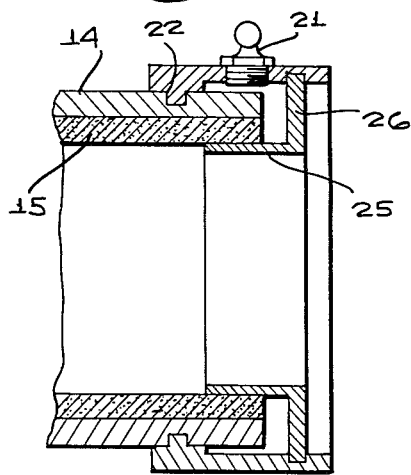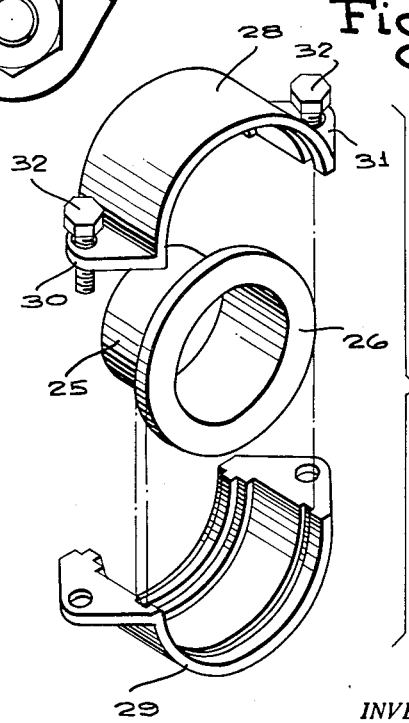

United States Patent Office 2,756,479
Patented July 31, 1956

2,756,479

APPARATUS FOR FORMING A PROTECTIVE SHEATH ABOUT AN END PORTION OF A PIPE HAVING AN INTERNAL LINER

Hughes Garneau, Tulsa, Okla.

Application January 14, 1955, Serial No. 481,764

3 Claims. (Cl. 25—38)

The present invention relates to a pipe having a liner and apparatus for forming a protective sheath about the end portion of the pipe and liner.

The primary object of the present invention is to provide a protective sheath about the end portion of a pipe having a liner so that two such pipes may be joined and may be completely protected from corrosive liquids carried in the pipe.

Another object of the present invention is to provide an apparatus for pressure casting or molding a protective sheath around the end portion of a pipe having a liner therein.

A further object of the present invention is to provide an apparatus for forming a sheath around an end portion of a pipe having a liner and one of sturdy construction, economical to manufacture, one highly effective in action in the field, and one which produces fully sheathed ends on lined pipes which formerly had the ends of their liners imperfectly sealed or cemented together during their assembly and were subject to destruction by the penetration of corrosive liquids carried in the pipe.

These and other objects of the present invention will be fully apparent from the following description when taken in connection with the annexed drawings, in which:

Figure 1 is a perspective view of a pipe having a liner and the apparatus of the present invention forming a protective sheath on the end portion of the pipe, Figure 2 is a perspective view of the pipe and the apparatus in assembled condition, Figure 3 is a side view in cross-section on line 3—3 of Figure 2, Figure 4 is another side view in cross-section showing the gun used for injecting the plastic or liquid settable material in attached position and showing the space between the pipe and the apparatus filled with the liquid settable material, Figure 5 is a view partially in cross-section showing two sections of pipe each provided with a sheath according to the present invention and joined by a coupling device, Figure 6 is a side view in cross-section of a second form of the apparatus of the present invention, and Figure 7 is a perspective view of the components of a second form of the apparatus shown in Figure 6.

In forming a protective sheath about an end portion of a pipe having an internal liner, I propose to use a hollow cylinder as shown in Figures 1 to 4, inclusive, and consisting of an inner shell and an outer shell 11 arranged in spaced concentric relation with respect to each other and having an end wall 12 closing one of the adjacent ends of the inner shell and the outer shell 11.

I propose to place the cylinder thus formed on a pipe having a liner so that the end wall 12 is spaced from the free end edge of an end portion 13 of the pipe 14 having a liner 15, and with the free end portion of the shell 11 frictionally engaging the inner periphery of the liner 15.

The free end portion of the outer shell 11 is provided with an extension 18 frictionally engageable with the adjacent part of the outer periphery of the pipe end portion 13 when the cylinder thus formed is so positioned and a confined space is formed between the free end portion 17 of the outer shell and the end portion 13 of the pipe, the space thus formed being connected and contiguous with the space between the end of the pipe and the end wall 12.

This confined space is then filled with a liquid settable material, such as cement, mortar, or the like, to form a protective sheath 19 around the pipe end portion 13, as seen in Figures 4 and 5.

In order to fill this space completely, and with a good bond to the liner 15, the liquid material is injected by means of a gun 20 which may be of the type used with lubricating greases, or the like, and having a high pressure output. The outer shell 11 is provided with a common injection fitting or element 21 attachable to the gun 20, as seen in Figures 3 and 4.

The pipe 14 is provided with a groove 22 adjacent its end into which will be received the flange on one end of the coupling element 23, as seen in Figure 5, and this groove 22 is used to hold the cylinder thus formed in place while the liquid material sets or hardens.

A hole is tapped in the outer shell 11 into which is screwed a set screw 24 engaging the groove 22 in the pipe.

In Figures 6 and 7, the cylinder is constructed of three parts, permitting easier assembly and cleaning.

The inner shell 25 is annular in shape with the end wall 26 attached while the outer shell 27 is formed from two half sleeves 28 and 29 each having flanged ends 30 and 31 through which extend the bolts 32 for securing the cylinder thus formed around the end portion of the pipe 14 and the liner 15, as in the first embodiment illustrated.

The structure of the fitting or element 22 may include a check valve (not shown) so that after pressure is applied by the gun 20 the liquid material completely fills the confined space in the cylinder and the gun may be removed. The sheath thus formed will thus take on its initial set, forming a good bond with the end face of the liner. After the pipe has been removed from the confined space, the cement sheath is allowed to finish its hardening process and after that may be handled in an ordinary manner without fear of damaging the end portion of the pipe or its liner.

A composition gasket 33, of rubber or other material, immune to the corrosive fluids used in the pipe, is used to seal the joint between the pipe sections, and is secured in place by the coupling 22, as shown in Figure 5.

What is claimed is:

1. Apparatus for forming a protective sheath about an end portion of a pipe comprising a hollow cylinder having an outer shell and an inner shell arranged in concentric spaced relation, and an end wall closing one of the adjacent ends of said inner and outer shells, said cylinder being adapted to be arranged so that the end wall is spaced from the free end edge of an end portion of a pipe having an internal liner with the free end portion of the inner shell frictionally engaging the inner periphery of said liner and the free end portion of the outer shell being spaced from the adjacent part of said pipe end portion, an extension carried by the free end portion of said outer shell and frictionally engageable with the adjacent part of the outer periphery of said pipe end portion when said cylinder is in position over said pipe end portion, and means on said outer shell for attachment thereto of an injection element.

2. Apparatus for forming a protective sheath about an end portion of a pipe comprising a hollow cylinder having an outer shell and an inner shell arranged in concentric spaced relation, and an end wall closing one of the adjacent ends of said inner and outer shells, said cylinder being adapted to be arranged so that the end wall is spaced from the free end edge of an end portion of a pipe having an internal liner with the free end portion of the inner shell frictionally engaging the inner periphery of said liner and the free end portion of the outer shell being spaced from the adjacent part of said pipe end portion, an extension carried by the free end portion of said outer shell and frictionally engageable with the adjacent part of the outer periphery of said pipe end portion when said cylinder is in position over said pipe end portion, means on said outer shell for attachment thereto of an injection element, and means carried by said extension and engageable with means formed on the outer periphery of said pipe end portion for retaining said cylinder in position thereon.

3. Apparatus for forming a protective sheath about an end portion of a pipe comprising a hollow cylinder having an outer shell and an inner shell arranged in concentric spaced relation, and an end wall closing one of the adjacent ends of said inner and outer shells, said cylinder being adapted to be arranged so that the end wall is spaced from the free end edge of an end portion of a pipe having an internal liner with the free end portion of the inner shell frictionally engaging the inner periphery of said liner and the free end portion of the outer shell being spaced from the adjacent part of said pipe end portion, an extension carried by the free end portion of said outer shell and frictionally engageable with the adjacent part of the outer periphery of said pipe end portion when said cylinder is in position over said pipe end portion, and an injecting gun carrying a supply of fluid settable material attached to said outer shell.

References Cited in the file of this patent

FOREIGN PATENTS 3,466    Great Britain _____ Feb. 15, 1896